(12) United States Patent
Burstrom

(10) Patent No.: US 7,774,524 B2
(45) Date of Patent: Aug. 10, 2010

(54) ADAPTIVE MULTITAP TIMEOUT

(75) Inventor: David Burstrom, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 74 days.

(21) Appl. No.: 11/622,725

(22) Filed: Jan. 12, 2007

(65) Prior Publication Data
US 2008/0169942 A1   Jul. 17, 2008

(51) Int. Cl.
*G06F 13/12* (2006.01)
*G09G 5/00* (2006.01)

(52) U.S. Cl. .......................... 710/67; 345/169
(58) Field of Classification Search ............. 710/67
See application file for complete search history.

(56) References Cited

U.S. PATENT DOCUMENTS 6,744,422 B1 * 6/2004 Schillings et al. ......... 345/169
2005/0060448 A1 * 3/2005 Gutowitz .................. 710/72
2006/0033718 A1 * 2/2006 Griffin .................... 345/168
2006/0163337 A1 * 7/2006 Unruh .................. 235/145 A

FOREIGN PATENT DOCUMENTS

FR         2 841 717 A1    1/2004
WO    WO 2004/003722 A2    1/2004

* cited by examiner

*Primary Examiner*—Henry W. H. Tsai
*Assistant Examiner*—Titus Wong
(74) *Attorney, Agent, or Firm*—Harrity & Harrity, LLP

(57) ABSTRACT

A communication device may receive successive key inputs, determine an average time duration between successive key inputs, start a timeout, determine if a timeout was successful and adjust the timeout period based on the determined success of the timeout.

12 Claims, 4 Drawing Sheets

ADAPTIVE MULTITAP TIMEOUT

TECHNICAL FIELD OF THE INVENTION

The invention relates to communication devices, and more particularly, to inputting text into communication devices.

DESCRIPTION OF RELATED ART

Communication devices, such as mobile terminals, may be used by individuals for communicating with users of other communication devices. For example, a communication device may be used to place/receive calls and send/receive text messages to/from other communication devices. Communication devices typically allow the user to enter text, such as text messages, via an alpha-numeric keypad where multiple letters are associated with a single key. Users are forced to wait for a timeout period when a next letter to be typed is located on the same key as the previous letter.

SUMMARY

According to one aspect a method is provided. The method comprises receiving successive key inputs; determining an average time duration between successive key inputs; starting a timeout; determining if the timeout was successful; and adjusting a timeout period based on at least one of the determined average time duration between successive key inputs or the determined success of the timeout.

Additionally, the determining success of the timeout further includes: determining if a backspace key is actuated.

Additionally, the method further comprises determining if a key entry mistake occurred.

Additionally, the timeout period is not adjusted when a key entry mistake has not occurred.

Additionally, the method further includes increasing the timeout period when an unsuccessful timeout is determined and a key entry mistake has not occurred.

According to another aspect, a communication device is provided. The communication device comprises a plurality of input keys; a timeout timer for starting a timeout period; and logic configured to: determine an average time period between successive actuations of an input key, determine the success of the timeout period, and adjust the timeout period of the timeout timer based on at least one of the determined average time period between successive actuations of an input key or the success of the timeout period.

Additionally, the logic is further configured to adjust the timeout period of the timer using the determined average time period between successive actuations of an input key when the timeout period is successful.

Additionally, the logic is further configured to discard the determined average time period between successive actuations of an input key when the timeout period is unsuccessful.

Additionally, the logic is further configured to increase the timeout period when the timeout period is unsuccessful.

Additionally, the logic is further configured to decrease the timeout period when the timeout period is successful.

According to another aspect, a communication device is provided. The communication device comprises means for determining an average time period $T_{avg}$ between successive actuations of an input key; and means for calculating a timeout period $T_o$ as: $T_o = T_{avg} \times A$, where A is an adjusting factor.

Additionally, the communication device further comprises means for starting a timeout using the calculated timeout period.

Additionally, the communication device further comprises means for determining when the timeout is successful.

Additionally, the means for calculating a timeout period is enabled when the timeout is determined to be successful.

Additionally, the communication device further comprises means for determining a key entry mistake, wherein the means for calculating a timeout period is not enabled when a key entry mistake is determined.

According to another aspect, a method is provided. The method comprises determining an average time duration between successive key inputs; initiating a timeout; determining if the timeout was successful; adjusting a timeout period based on the determined average time duration between successive key inputs or the determined success of the timeout; counting a number of times that the timeout period has been adjusted; and setting the timeout period to a fixed value when the timeout period has been adjusted a predetermined number of times.

Additionally the setting the timeout period when the timeout period has been adjusted a predetermined number of times further includes: permanently setting the timeout period to its current value after being adjusted the predetermined number of times.

Additionally, the method further comprises increasing the timeout period when the timeout period is unsuccessful.

Additionally, the method further comprises decreasing the timeout period when the timeout period is successful.

Additionally, the method further comprises decreasing the timeout period by calculating a new timeout period using the determined average time duration between successive key inputs.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION OF THE INVENTION

The following detailed description of the embodiments refers to the accompanying drawings. The same reference numbers in different drawings may identify the same or similar elements. Also, the following detailed description does not limit the embodiments.

Exemplary Communication Device

Figure 1:
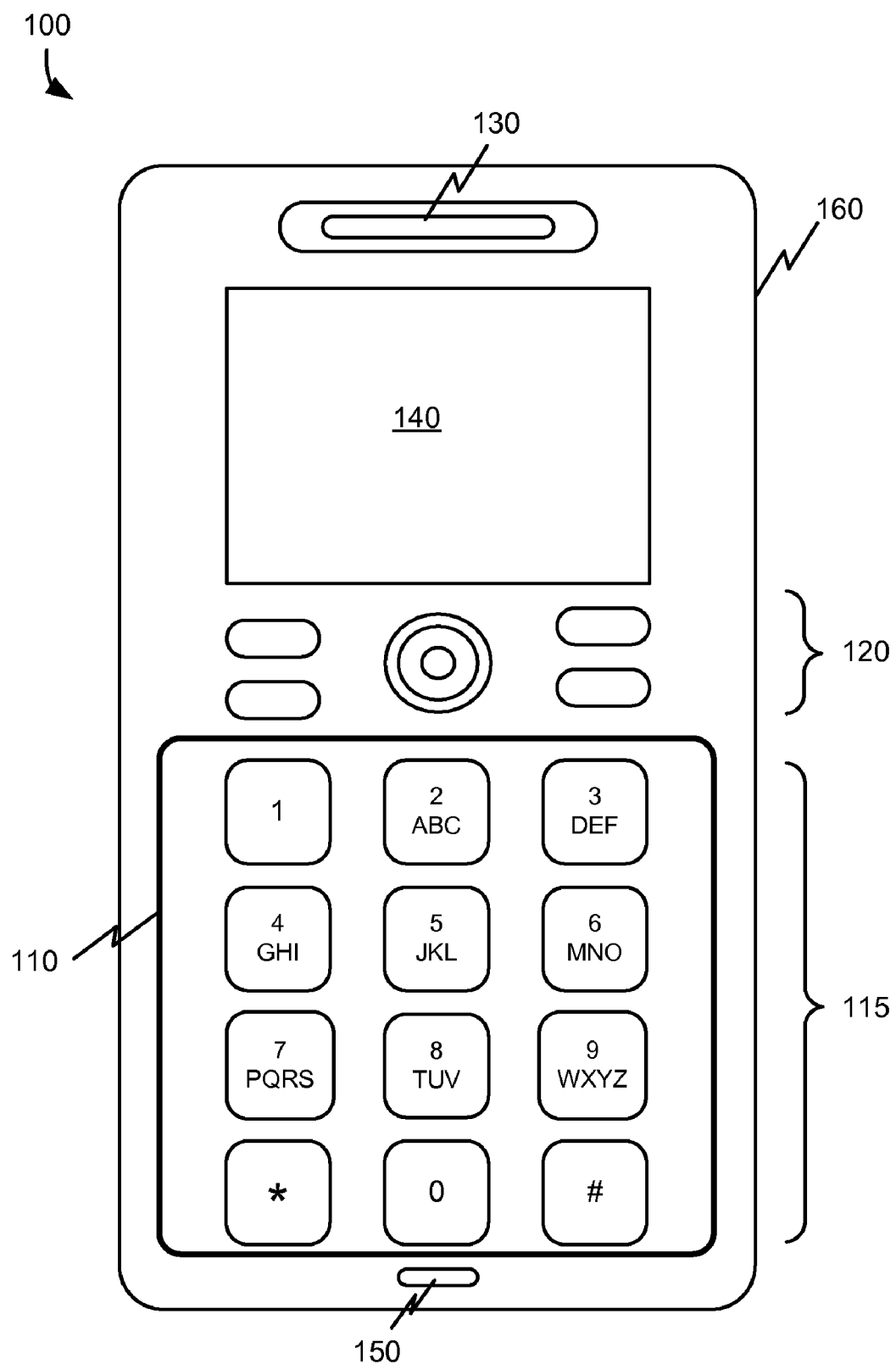
FIG. 1 is a diagram of an exemplary implementation of a communication device.

FIG. 1 is a diagram of an exemplary implementation of a communication device 100 consistent with the embodiments described herein. Communication device 100 may be a mobile communication device. As used herein, a "communication device" and/or "communication terminal" may include a radiotelephone; a personal communications system (PCS) terminal that may combine a cellular radiotelephone with data processing, a facsimile, and data communications capabilities; a personal digital assistant (PDA) that can include a radiotelephone, pager, Internet/intranet access, web browser, organizer, calendar, and/or global positioning system (GPS) receiver; a laptop; a palmtop receiver and/or another type of communication device.

Communication device 100 may include housing 160, keypad 110, control keys 120, speaker 130, display 140, and microphone 150. Housing 160 may include a structure configured to hold devices and components used in communication device 100. For example, housing 160 may be formed from plastic, metal, or composite and may be configured to support keypad 110, control keys 120, speaker 130, display 140 and microphone 150.

Keypad 110 may include devices and/or logic that can be used to operate communication device 100. Keypad 110 may further be adapted to receive user inputs, directly or via other devices, such as a stylus for entering information into communication device 100. In one implementation, communication functions of communication device 100 may be controlled by activating keys 115. Implementations of keys 115 may have character information associated therewith, such as numbers, letters, symbols, etc. For example, the number 2 and the letters "a," "b" and "c" may be associated with the "2" key, the number 3 and the letters "d," "e" and "f" may be associated with the "3" key, etc. The user may select keys 115 to enter, for example, characters, letters, digits, commands, and/or text into communication device 100.

Control keys 120 may include buttons and/or knobs that permit a user to interact with communication device 100 to cause communication device 100 to perform specified actions, such as to display text via display 140, and to send or receive text messages to/from another communication device 100, etc.

Speaker 130 may include a device that provides audible information to a user of communication device 100. Display 140 may include a device that provides visual images to a user. For example, display 140 may provide text messages to the user. Display 140 may also provide graphic information regarding incoming/outgoing calls, games, phonebooks, the current date/time, volume settings, etc., to a user of communication device 100. Display 140 may be implemented as a black and white or a color display.

Microphone 150 may include a device that receives audible information from a user. Microphone 150 may, in some implementations, convert speech or other acoustic signals into electrical signals for use by communication device 100.

Figure 2:
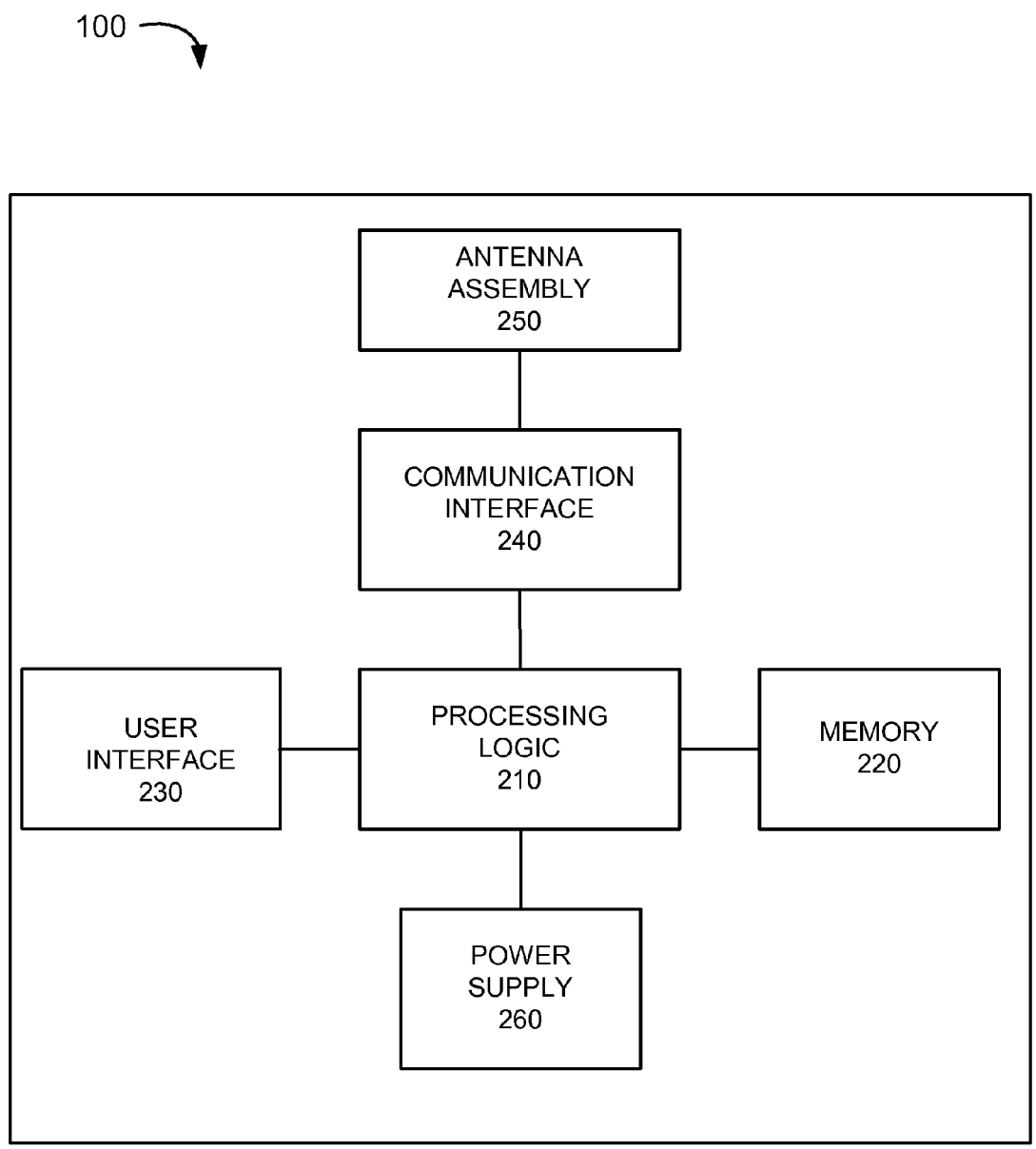
FIG. 2 illustrates an exemplary functional diagram of the communication device of FIG. 1.

FIG. 2 illustrates an exemplary functional diagram of a communication device, such as communication device 100, consistent with the embodiments described herein. As shown in FIG. 2, communication device 100 may include processing logic 210, memory 220, user interface 230, communication interface 240, antenna assembly 250, and power supply 260.

Processing logic 210 may include a processor, microprocessor, an application specific integrated circuit (ASIC), field programmable gate array (FPGA), or the like. Processing logic 210 may include data structures or software programs to control operation of communication device 100 and its components. Implementations of communication device 100 may use an individual processing logic component or multiple processing logic components, such as processing logic components operating in parallel.

Memory 220 may include a random access memory (RAM), a read only memory (ROM), and/or another type of memory to store data and instructions that may be used by processing logic 210. Memory 220 may also contain data structures, such as a dictionary and next word candidate lists.

Figure 3:
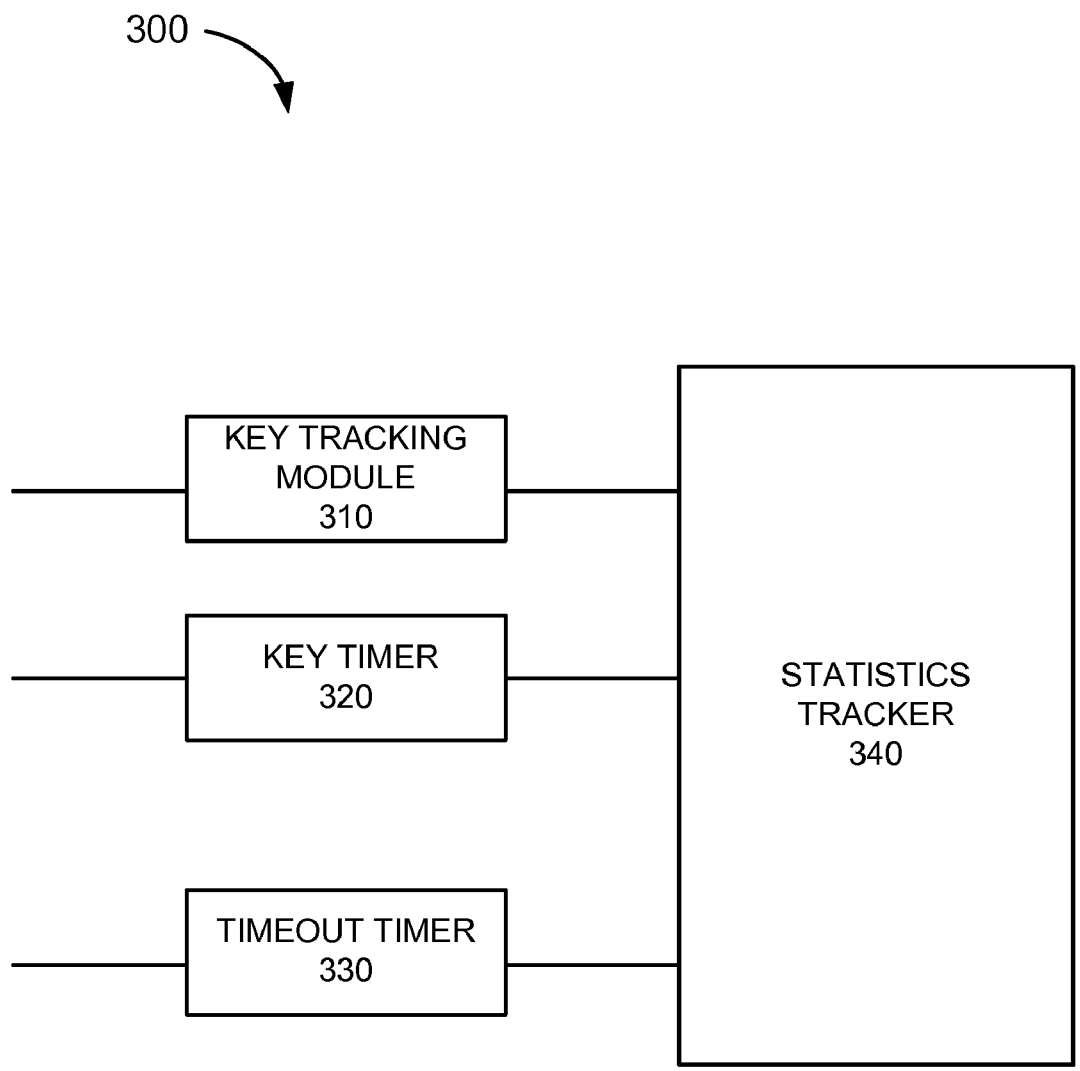
FIG. 3 illustrates an exemplary timeout adjustment system.

User interface 230 may include mechanisms, such as hardware and/or software, for inputting information to communication device 100 and/or for outputting information from communication device 100, such as display 140 and keypad 110. User interface 230 may include multi-tap text processing to receive character inputs via keys 115, and produce a text display on display 140, for example. User interface 230 may also include a timeout adjusting system as shown in FIG. 3, for example, as described in detail below.

Communication interface 240 may include, for example, a transmitter that may convert baseband signals from processing logic 210 to radio frequency (RF) signals and/or a receiver that may convert RF signals to baseband signals. Alternatively, communication interface 240 may include a transceiver to perform functions of both a transmitter and a receiver. Communication interface 240 may connect to antenna assembly 250 for transmission and reception of RF signals. Antenna assembly 250 may include one or more antennas to transmit and receive RF signals over the air. Antenna assembly 250 may receive RF signals from communication interface 240 for transmitting over the air, and receive RF signals over the air for conveying to communication interface 240.

Power supply 260 may include hardware and/or software to provide power to components of communication device 100. For example, power supply 260 may include one or more batteries and/or connections to receive power from other devices, such as an accessory outlet in an automobile, an external battery, or a wall outlet. Power supply 260 may include metering logic to provide the user and components of communication device 100 with information about battery charge levels, output levels, power faults, etc.

As will be described in detail below, communication device 100, consistent with the embodiments described herein, may perform certain operations relating to dynamically monitoring and adjusting a timeout period in response to user inputs and/or in response to instructions associated with processing logic 210. Communication device 100 may perform such operations in response to processing logic 210 executing software instructions contained in a computer-readable medium, such as memory 220. A computer-readable medium may be defined as a physical or logical memory device and/or carrier wave.

The software instructions may be read into memory 220 from another computer-readable medium or from another device via communication interface 240. The software instructions contained in memory 220 may cause processing logic 210 to perform processes that will be described later. Alternatively, hardwired circuitry may be used in place of or in combination with software instructions to implement processes consistent with the embodiments. Thus, implementations consistent with the principles of the embodiments described herein are not limited to any specific combination of hardware circuitry and software.

Exemplary Timeout Adjustment System

FIG. 3 illustrates an exemplary timeout adjusting system 300 consistent with principles of the embodiments described herein. In one implementation, timeout adjusting system 300 may be contained in user interface 230. Timeout adjusting system 300 may contain a key tracking module 310, a key timer 320, a timeout timer 330 and a statistics tracker 340, for example.

Key tracking module 310 may contain hardware and/or software for monitoring actuations of keys 115. For example, each time a key 115 is actuated, the specific key may be determined. In one implementation, key tracking module 310 may contain a memory for storing inputted text and may also determine key entry mistakes by comparing originally input words to corrected words. For example, if a user inputs the word "car" and then changes the word to "cat," this may be identified by key tracking module 310 as an operator key entry error, as the error is an erroneous key actuation. If for example, an inputted word is changed from "baat" to "cat," this may be identified by key tracking module 310 as a timeout error, as the error was not produced by an erroneous key entry, but by an inadequate timeout period. Key tracking module 310 may also determine actuations of "backspace" or "erase" keys, and if no "backspace" or "erase" key actuation has been detected, key tracking module 310 may determine valid key time duration data that may be sent to statistics tracker 340, as explained below.

Key timer 320 may contain hardware and/or software for monitoring time durations between successive key actuations. For example, key timer 320 may monitor and determine time durations between actuations of keys 115. For example, if the user actuates the "7" key four times, in order to enter an "s," the time durations between each of the four successive actuations may be stored in key timer 320. If a timeout is successful, as determined by key tracking module 310, the stored time durations may then be transmitted from key timer 320 to statistics tracker 340.

Timeout timer 330 may contain hardware and/or software to provide a timing mechanism for a "timeout" functionality used in multi-tap key inputs from keypad 110 in order to determine a character from one of a plurality of characters that may be associated with a given key 115. For example, timeout timer 330 may provide a timeout period ($T_o$) wherein if no key actuations are received within this timeout period, the displayed character is accepted and a cursor may be advanced on display 140 to allow for entry of a next character.

Statistics tracker 340 may contain a memory for storing time durations between successive key actuations and may contain logic for adjusting the timeout timer 330. For example, statistics tracker 340 may send a signal to timeout timer 330 to adjust a timeout period, based on received key time duration values from key timer 320, for example. For example, if key tracking module 310 determines that key duration values may be valid, the stored key duration values may be sent from key timer 320 to statistics tracker 340 for processing. Statistics tracker 340 may store previously received key time duration values and may calculate an average time "$T_{avg}$" between successive key actuations for example. Statistics tracker 340 may also calculate and adjust a timeout period $T_o$ based on the average time between key actuations time "$T_{avg}$" and an adjusting factor "A." For example, statistics tracker 340 may use an exemplary formula such as: $T_o = T_{avg} \times A$, in order to calculate a timeout period $T_o$. The adjusting factor A may be a number slightly greater than 1, in order to ensure that the timeout period ($T_o$) is slightly larger than the average time ($T_{avg}$) it takes a user to actuate a key. For example, A may be equal to 1.25.

Exemplary Processing

Figure 4:
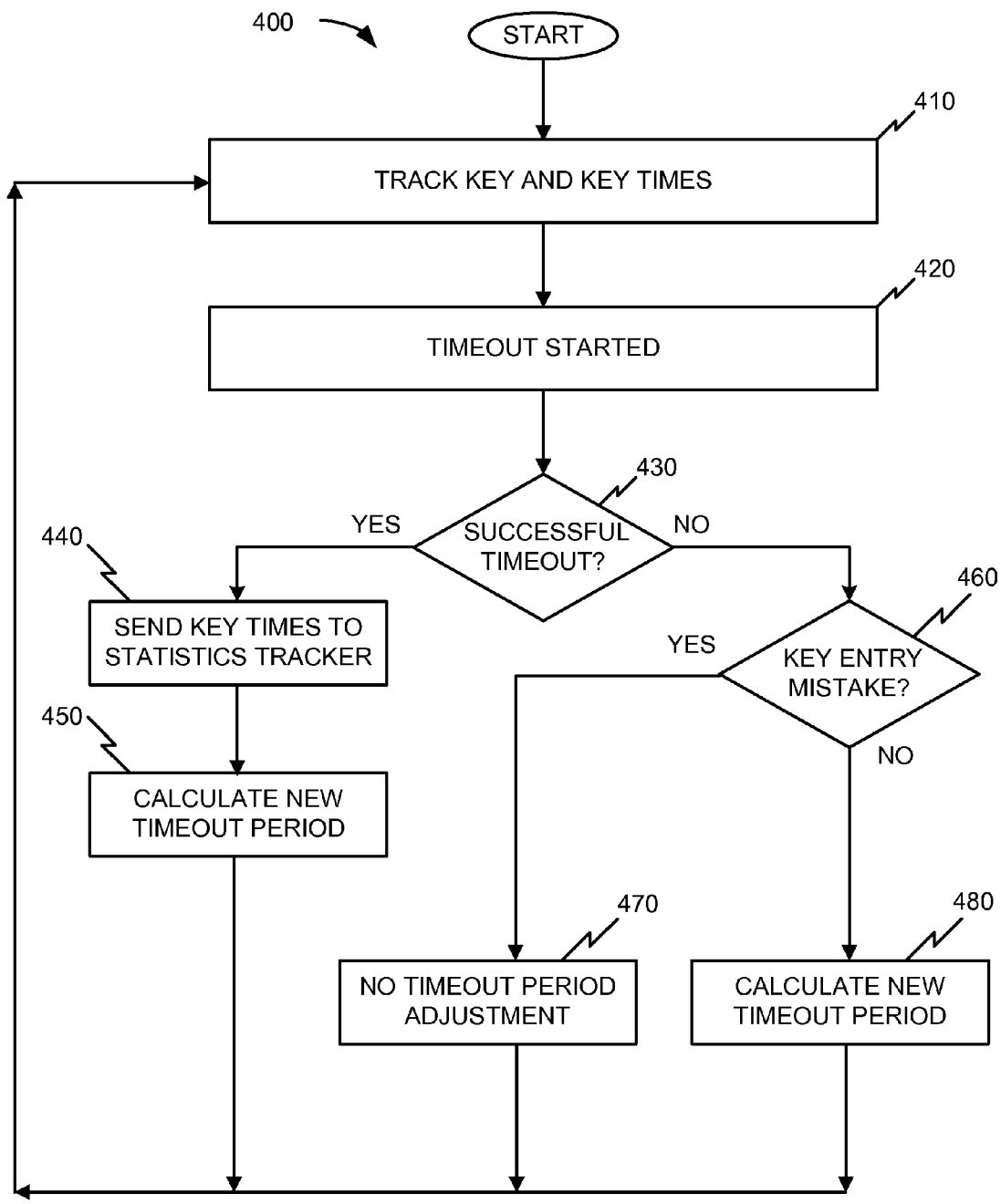
FIG. 4 illustrates an exemplary flow diagram providing adjustments of the timeout period.

FIG. 4 is a flowchart of an exemplary process 400 for monitoring and adjusting a timeout period. Process 400 may begin by tracking input keys and key time durations (act 410). For example, each time a user presses or actuates a key 115, the key 115 is monitored and the time duration between actuations may be measured. For example, if a user is spelling the word "cat," the 2 key 115 (that may have the letters "a," "b" and "c" associated with it) may be pressed three times by the user to indicate the letter "c" is desired, in accordance with a conventional multi-tap entry method. In this example, key tracking module 310 monitors each actuation of the 2 key 115, and may measure or determine the time duration between each of the three actuations of the 2 key. For example, the time duration between the first and second actuation may be 0.4 seconds and the measured time duration between the second and third actuation may be 0.6 seconds. After the third actuation of the 2 key 115 a timeout period may be started (act 420). During this period, the user may not press a key 115 for the current timeout period that may be set at for example, one second. If a key 115 is not actuated within the current timeout period, a timeout may expire. For example, if the user is spelling the word "cat," as the "c" and "a" may be associated with the same key 115 (i.e. the 2 key), the user may not actuate the 2 key (to enter an "a") until after a timeout period has expired in order to ensure that the "c" letter has been selected and acknowledged by processing logic 210, such as by displaying the letter via display 140.

After the entry of each letter, a successful timeout may be determined (act 430). For example, key tracking module 310 may continue to monitor key 115 actuations, and if a "backspace" or "erase" key is depressed, this may indicate that the timeout was unsuccessful, as the user may be changing the previously entered character, for example. If the user actuates the 2 key to enter an "a" after "c," key monitoring module 310 may determine that the timeout was successful as the user is continuing to enter letters. If key tracking module 310 monitors that a different key 115 than the previous key 115 is actuated, this may also indicate that the timeout was successful.

If the timeout was determined to be successful in act 430, the time duration(s) between successive key actuations may be sent from key timer 320 to statistics tracker 340 (act 440). As mentioned above, the measured time duration of 0.4 seconds between the first and second actuation of the 2 key 115, and the measured time duration of 0.6 seconds between the second and third actuation of the 2 key, obtained while the user successfully entered the letter "c," may be provided to statistics tracker 340.

Statistics tracker 340 may then calculate a new timeout period (act 450). For example, statistics tracker 340 may receive the key time durations provided in act 440, calculate a new average time period, and then calculate a new timeout period with a formula such as $T_o = T_{avg} \times A$. For example, using the time duration between the first and second actuation of 0.4 seconds and the measured time duration between the second and third actuation of 0.6 seconds, an average time $T_{avg}$ of 0.5 seconds may be calculated by statistics tracker 340. If, for example, the adjusting factor A is currently equal to 1.5, using the exemplary timeout formula, a new timeout period $T_o$ may be calculated in act 450 as 0.75 seconds (0.75=0.5×1.5). In another embodiment, statistics tracker 340 may use previously received key time durations in order to calculate an average time ($T_{avg}$). For example, statistics tracker 340 may calculate an average time using the last 10 received key time durations, for example.

If for example the timeout was determined to be unsuccessful at act 430, a key entry mistake may be determined (act 460). For example, key tracking module 310 may store inputted letters and may determine if a key entry mistake occurred. For example, if a user types in the word "car" and then changes the word to "cat," this may be identified by key tracking module 310 as an error that was due to a key entry mistake, as the changed letter is associated with a different key 115 on keypad 110. If, for example, a user enters "baat" and changes the word to "cat," this may be identified by key tracking module 310 as an error due to the timeout period being too short, as the changed letters are all associated with the same key 115 on keypad 110. If a key entry mistake was determined, the timeout period may not be adjusted (act 470). For example, the key time durations obtained by key timer 320 may not be supplied to statistics tracker 340.

If, for example, a key entry mistake was not detected (act 460), a new timeout period may be calculated (act 480). For example, as the timeout was unsuccessful and not determined to be an entry mistake, this may indicate that the timeout period is not long enough and statistics tracker 340 may increase the adjustment factor A in order to calculate a new timeout period. For example, if the adjustment factor A was originally equal to 1.5, statistics tracker 340 may increase the value to 1.6, for example. After increasing the adjustment factor A to 1.6, a new timeout period may be calculated (act 480).

In another implementation, process 400 may be performed a predetermined number of times in order to determine a timeout period that may not be further adjusted. For example, statistics tracker 340 may count the number of times the timeout period has been adjusted. For example, process 400 may be performed 1000 times, wherein the timeout period may be increased and decreased accordingly as described above. After performing process 400 for the predetermined number of times (e.g., 1000) for example, the timeout period value may then be set to its current value. This fixed value may then be permanently used in timeout timer 330, and not further adjusted by statistics tracker 340.

In another implementation, process 400 may adjust the timeout period by a fixed amount in act 480. For example, if the timeout was unsuccessful and a key entry mistake did not occur, the timeout period may be increased (in act 480) by a predetermined amount of time, such as 0.25 seconds, by statistics tracker 340. For example, if the timeout period was originally equal to 1.1 seconds, statistics tracker 340 may increase the timeout period to 1.35 seconds, for example.

Conclusion

Implementations consistent with principles of the embodiments described herein may provide an adaptive multi-tap timeout period for a communication device to aid the user in entering text.

The foregoing description of preferred embodiments provides illustration and description, but is not intended to be exhaustive or to limit the embodiments to the precise form disclosed. Modifications and variations are possible in light of the above teachings or may be acquired from practice of the embodiments.

While a series of acts has been described with regard to FIG. 4, the order of the acts may be modified in other implementations consistent with the principles of the embodiments. Further, non-dependent acts may be performed in parallel.

It will be apparent to one of ordinary skill in the art that aspects of the embodiments, as described above, may be implemented in many different forms of software, firmware, and hardware in the implementations illustrated in the figures. The actual software code or specialized control hardware used to implement aspects consistent with the principles of the embodiments is not limiting of the embodiments. Thus, the operation and behavior of the aspects were described without reference to the specific software code--it being understood that one of ordinary skill in the art would be able to design software and control hardware to implement the aspects based on the description herein.

Further, certain portions of the embodiments may be implemented as "logic" that performs one or more functions. This logic may include hardware, such as a processor, a microprocessor, an application specific integrated circuit or a field programmable gate array, software, or a combination of hardware and software.

It should be emphasized that the term "comprises/comprising" when used in this specification and/or claims is taken to specify the presence of stated features, integers, steps or components but does not preclude the presence or addition of one or more other features, integers, steps, components or groups thereof.

No element, act, or instruction used in the present application should be construed as critical or essential to the embodiments unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising: receiving successive key inputs from a plurality of input keys, where the successive key inputs include a first key input and a second key input; determining, by processing logic, an average time duration between the successive key inputs; starting, by the processing logic, a timeout period after the first key input, where the second key input, when received during the timeout period, is associated with a first character, and where the second key input, when received after the timeout period, is associated with a second character; maintaining, by the processing logic, the timeout period in response to a key entry mistake, where the key entry mistake includes at least one of the first key input or the second key inputs being received in error; adjusting, by the processing logic, the timeout period based on the determined average time duration between the successive key inputs received from the plurality of input keys when the second key input is associated with a correct character where the correct character is an intended one of the first character or the second character; adjusting, by the processing logic, the timeout period based on the determined average time duration between the successive key inputs received from the plurality of input keys in response to a timeout error, where the time out error includes the second key input being associated with one of the first character or the second character that is not the correct character; and counting a number of times that the timeout period has been adjusted; and ceasing adjustments of the timeout period when the number of times that the timeout period has been adjusted equals a particular number of times.

2. The method of claim 1, further comprising:
   detecting the key entry mistake, including determining when a backspace key is actuated.

3. The method of claim 1, where adjusting the timeout period in response to a timeout error includes:
   increasing the timeout period.

4. A communication device comprising: a plurality of input keys; a timeout timer for starting a timeout period when one of the plurality of the input keys is actuated; and processing logic to: determine an average time period between successive actuations of the plurality of the input keys, where the successive actuations include a first actuation and a second actuation, where the second actuation, when occurring during the timeout period, is associated with a first character, and where the second actuation, when occurring after the timeout period, is associated with a second character, maintaining the timeout period in response to a key entry mistake, where the key entry mistake includes at least one of the first actuation or the second actuation being in error, adjust the timeout period of the timeout timer based on the determined average time period between successive actuations of the input keys when the second actuation is associated with correct character, where the correct character is an intended one of the first character or the second character, adjust the timeout period of the timeout timer based on the determined average time period between successive actuations of the input keys in response to a timeout error, where the timeout error includes the second actuation being associated with one of the first character or the second character that is not the correct character; and where the processing logic is further to: count a number of times that the timeout period has been adjusted; and cease adjustments of the timeout period when the number of times that the timeout period has been adjusted equals a particular number of times.

5. The communication device of claim 4, where the processing logic is further to:
discard the determined average time period when in response to one of the key entry mistake or the timeout error.

6. The communication device of claim 5, where the processing logic, when adjusting the timeout period in response to the timeout error, is further to:
increase the timeout period.

7. The communication device of claim 6, where, when adjusting the timeout period when the second actuation is associated with the correct character, the processing logic is further to:
decrease the timeout period.

8. A communication device comprising: a plurality of input keys on a key pad; a memory to store instructions; and a processor to execute the instructions to implement: means for determining an average time period $T_{avg}$ between actuations of one or more of the plurality of the input keys, where the actuations include a first actuation and a second actuation; means for calculating a timeout period, where the timeout period $T_o$ is calculated as: $T_o = T_{avg} \times A$, where A is an adjusting factor; means for initiating a timeout, using the calculated timeout period, after the first actuation, where the second actuation, when occurring during the timeout, is associated with a first character, and where the second actuation, when occurring after the timeout, is associated with a second character; means for determining whether the timeout is successful, where the timeout was successful when the second actuation is associated with a correct character, where the correct character is an intended one of the first character or the second character; means for detecting, when the timeout was not successful, at least one of a key entry mistake or a timeout error, where the key entry mistake includes at least one of the first actuation or the second actuation being in error, and where the timeout error includes the second actuation being associated with other one of the first character or the second character that is not the correct character; means for adjusting the timeout period, when the timeout error is detected; means for maintaining the timeout period, when the key entry mistake is detected; means for counting a number of times that the timeout period has been adjusted; and means for ceasing adjustments of the timeout period when the number of times that the timeout period has been adjusted equals a particular number of times.

9. A method performed by a device, the method comprising: determining, by processing logic of the device, an average time duration between successive key inputs comprising a first key input and a second key input; initiating, by the processing logic, a timeout after the first key input, where the second key input, when occurring during the timeout, is associated with a first character, and where the second key input, when occurring after the timeout, is associated with a second character; determining, by the processing logic, whether the timeout was successful, where the timeout was successful when the second input is associated with a correct character, the correct character being an intended one of the first character or the second character; adjusting, by the processing logic, a timeout period based on at least one of the determined average time duration between successive key inputs or determining whether the timeout was successful; counting, by the processing logic, a number of times that the timeout period has been adjusted; ceasing, by the processing logic, adjustments of the timeout period when the number of times that the timeout period has been adjusted equals a particular number of times and decreasing the timeout period in response to a timeout error, where the timeout error includes the second key input being associated with one of the first character or the second character that is not the correct character.

10. The method of claim 9, further comprising:
increasing the timeout period when the timeout is not successful.

11. The method of claim 9, further comprising:
decreasing the timeout period when the timeout is successful.

12. The method of claim 11, further comprising:
decreasing the timeout period by calculating a new timeout period using the determined average time duration between the successive key inputs.

* * * * *